UNITED STATES PATENT OFFICE.

HENRY VAIL DUNHAM, OF BAINBRIDGE, NEW YORK, ASSIGNOR TO NACIREMA CHEMICAL COMPANY, A CORPORATION OF VERMONT.

ART OF CONVERTING PHOSPHORITES.

1,074,779.   Specification of Letters Patent.   Patented Oct. 7, 1913.

No Drawing.   Application filed September 14, 1911.   Serial No. 649,326.

*To all whom it may concern:*

Be it known that I, HENRY V. DUNHAM, a citizen of the United States, residing at Bainbridge, in the county of Chenango and State of New York, have invented or discovered certain new and useful Improvements in the Art of Converting Phosphorites, of which the following is a specification.

This invention relates to the treatment of phosphorites or phosphate rock to render the same suitable for fertilizing purposes, and has for its object so to treat the phosphate rock, by a relatively inexpensive process, that the treated product will contain a large percentage of "citrate soluble" or "dilute citric acid soluble" phosphate, which is suitable for plant life and which is known in the art as "available phosphate," or "available phosphoric acid."

The present process of rendering the phosphoric acid in the rock available for use, which process is applicable to phosphorites whether they be in the form of phosphates of calcium, iron or aluminum, consists broadly in mixing with the said phosphorites, reagents which are decomposed by heating and which evolve certain gases when heated to the decomposing points. The gases produced may be a mixture of carbon dioxid and either sulfur dioxid or sulfuric anhydrid; the essential requirements for producing the desired reactions being that the carbon dioxid and sulfur dioxid or trioxid must be used while in the nascent condition, which is accomplished by having the reagents from which they are produced in a state of intimate association with the finely ground phosphate rock.

In carrying this invention into effect the phosphate rock is first ground to about 80 or 100 mesh. To the ground phosphorite is then added relatively small proportions of any desired carbonate (unless the ground phosphate contain a carbonate) and of any desired sulfate or other equivalent reagent, and preferably an amount of water sufficient to form a thin mud when the water and reagent have been well mixed with the ground rock or phosphorite. The mixture is then heated, without the addition of other materials thereto, in a calcining furnace to a high heat, preferably a white heat, the mixture being agitated throughout the whole heating operation as for instance by employing a rotary cylindrical calciner and rotating the same continuously. This heating treatment is continued for about one hour, the length of time of the heating treatment depending somewhat upon the quality or grade of rock being treated.

I find that to cause the conversion of every 100 lbs. of phosphate rock suitable proportions of reagent are 12 lbs. of sodium sulfate and 12 lbs. of calcium or sodium carbonate. The mixture of nascent carbon dioxid and sulful dioxid or sulfuric anhydrid produced by heating reacts on the ground phosphate and converts it into "available" phosphate, which is not soluble in water, but is soluble in ammonium citrate solution.

In carrying out my process no carbon, coal, or like reducing agent is added to the mixture of phosphate rock, and converting salts. The addition of such reducing agents would prevent the formation of material amount of carbon dioxid, sulfur dioxid and sulfur trioxid.

After the heated phosphate rock has been properly calcined it is removed from the furnace, and when it has cooled it is ground to a fine powder of from 80 to 100 mesh. It is then ready to be applied to the soil or mixed with other ingredients which are generally used in the manufacture of fertilizers.

Having thus described my invention I claim and desire to secure by Letters Patent:

1. A process of converting the phosphoric acid of phosphate rock into the ammonium citrate-soluble state, but not into the water-soluble state, which comprises producing an intimate mixture of said phosphate, a carbonate and a sulfate, and heating said mixture to substantially a white heat, in the substantial absence of reducing agents, until said conversion is substantially complete.

2. A process of rendering the phosphoric acid of phosphate rock soluble in ammonium citrate solution, but not soluble in water, which comprises producing an intimate mixture of said phosphate an alkali metal carbonate and an alkali metal sulfate, and heating said mixture to a white heat, in the substantial absence of reducing agents, until said conversion is substantially complete.

3. A process of rendering the phosphoric acid of phosphate rock soluble in ammonium citrate, but not in water, said process comprising the step of producing an intimate mixture of said phosphate, an alkali metal carbonate and an alkali metal sulfate, each in amount equal to about 12% of the amount of phosphate rock, and heating said mixture to substantially a white heat, in the substantial absence of reducing agents, for about one hour.

4. A process of converting the phosphoric acid of phosphate rock into a condition in which it is soluble in ammonium citrate, but insoluble in water, which comprises producing an intimate mixture of said phosphate, a carbonate and a sulfate, by mixing said materials in the presence of sufficient water to form a plastic mass, and heating said mixture to substantially a white heat, in the substantial absence of reducing agents, until said conversion is substantially complete.

5. A process of converting the phosphoric acid of phosphate rock into citrate-soluble, but not water-soluble condition which comprises producing an intimate mixture of said phosphate, a carbonate and a sulfate, and heating said mixture to substantially a white heat, in the substantial absence of reducing agents, for about an hour.

6. A process of converting the phosphoric acid of phosphate rock into a form in which it is soluble in neutral citrate solution, but insoluble in water, which comprises producing an intimate admixture of said phosphate, a carbonate and a sulfate, and heating said admixture to substantially a white heat, in the substantial absence of reducing agents, while continuously agitating said mixture, until said conversion is substantially complete.

In testimony whereof I affix my signature, in presence of two witnesses.

HENRY VAIL DUNHAM.

Witnesses:
    A. A. DUNHAM,
    R. C. WILCOX.